(12) United States Patent
Liu et al.

(10) Patent No.: US 7,358,873 B2
(45) Date of Patent: Apr. 15, 2008

(54) LVDS AND TMDS DUALFUNCTION DEVICE

(75) Inventors: Wen-Bo Liu, Taipei (TW); Yu-Feng Cheng, Taipei (TW); Ken-Ming Li, Taipei (TW); Vai-Hang Au, Taipei (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 11/537,682

(22) Filed: Oct. 2, 2006

(65) Prior Publication Data

US 2007/0103349 A1    May 10, 2007

Related U.S. Application Data

(60) Provisional application No. 60/735,639, filed on Nov. 10, 2005.

(51) Int. Cl.
*H03M 9/00* (2006.01)

(52) U.S. Cl. ...................... 341/100; 341/101

(58) Field of Classification Search ............... 341/100, 341/101; 326/115, 121; 327/108, 87
See application file for complete search history.

(56) References Cited

U.S. PATENT DOCUMENTS 6,847,335 B1 *   1/2005   Chang et al. .............. 345/3.1
7,253,663 B2 *   8/2007   Cho et al. .................. 326/115

* cited by examiner

*Primary Examiner*—Brian Young
(74) *Attorney, Agent, or Firm*—Thomas, Kayden, Horstemeyer & Risley (57) ABSTRACT

A LVDS and TMDS dualfunction transmitter for both LVDS and TMDS output channels is disclosed, including an encoder and a serializer. The encoder encodes twenty eight bits of LVDS signals to thirty bits of TMDS signals. The serializer includes four serializer channels for converting the LVDS signals to a serial signal when a LVDS mode is enabled, or converting the TMDS signals to the serial signal when a TMDS mode is enabled. Wherein a first serializer channel is coupled to seven bits of the LVDS signals and outputting a first pair of differential signals. Second, third and fourth serializer channel are coupled to seven bits of the LVDS signals and ten bits of TMDS signals, and outputting a second, third and fourth pair of differential signals, respectively.

4 Claims, 8 Drawing Sheets

LVDS AND TMDS DUALFUNCTION DEVICE

CROSS REFERENCE TO RELATED APPLICATIONS

This application claims the benefit of U.S. Provisional Application No. 60/735,639, filed 10th, Nov. 2005.

BACKGROUND OF THE INVENTION

1. Field of the Invention

The invention relates to a LVDS and TMDS dual function device, and in particular to a LVDS and TMDS dualfunction device with a set of pins outputting signals using serializers coupled to both internal LVDS and TMDS signals.

2. Description of the Related Art

LVDS and TMDS are two major interfaces for flat panel display devices. A graphic device driving flat panel display devices normally includes both interfaces, and in some designs, both interfaces are implemented through the same group of pins.

Figure 1:
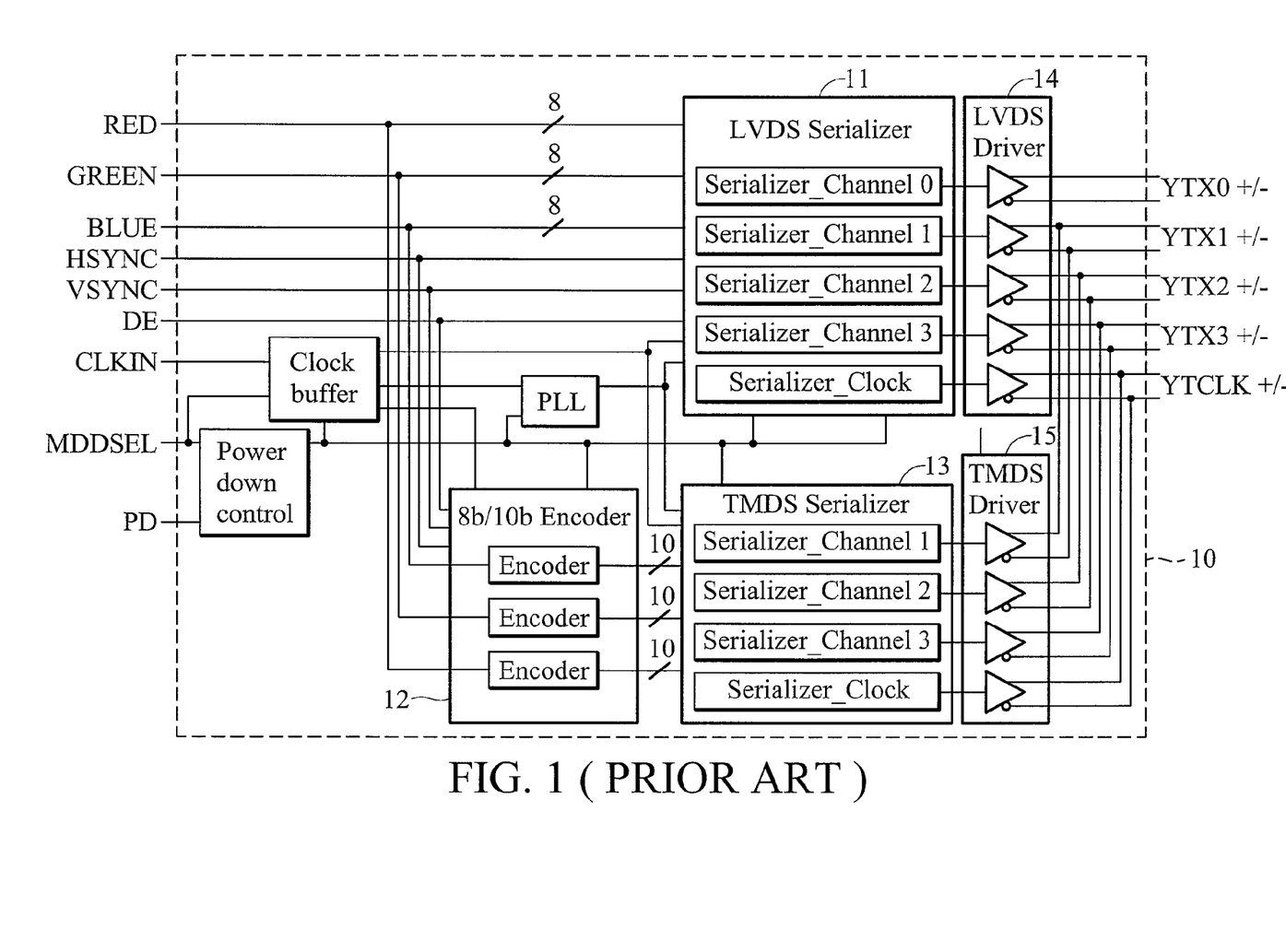
FIG. 1 is a block diagram of a conventional LVDS/TMDS dual function transmitter.

FIG. 1 is a block diagram of a conventional LVDS/TMDS dual function transmitter 10, including twenty-eight bits of LVDS signals (i.e. RED (0:7), GREEN (0:7), BLUE (0:7), HSYNC, VSYNC, DE and D23Y(not shown in FIG. 1) signals), an encoder 12 encoding the LVDS signals to thirty bits of TMDS signals, an LVDS serializer 11, a TMDS serializer 13, a LVDS driver 14, and a TMDS driver 15.

In LVDS mode, the transmitter directs the twenty-eight bits of LVDS signals, to four output channels of the LVDS serializing device 11 with 7:1 serializers. In TMDS mode, the transmitter first directs the twenty-eight bits of LVDS signals to encoder 12, then 30 encoded signals are separated to 3 data streams (10-bit) for the three output channels of the TMDS serializing device 13 with 10:1 serializer.

Finally, the LVDS driver 14 and TMDS driver 15 are coupled together for each channel (except channel 0), such that data is output from the same terminal like YTX0, YTX1, YTX2, YTX3, and YTXC (clock channel). The channel YTX0 is only enabled for the LVDS mode.

Figure 2:
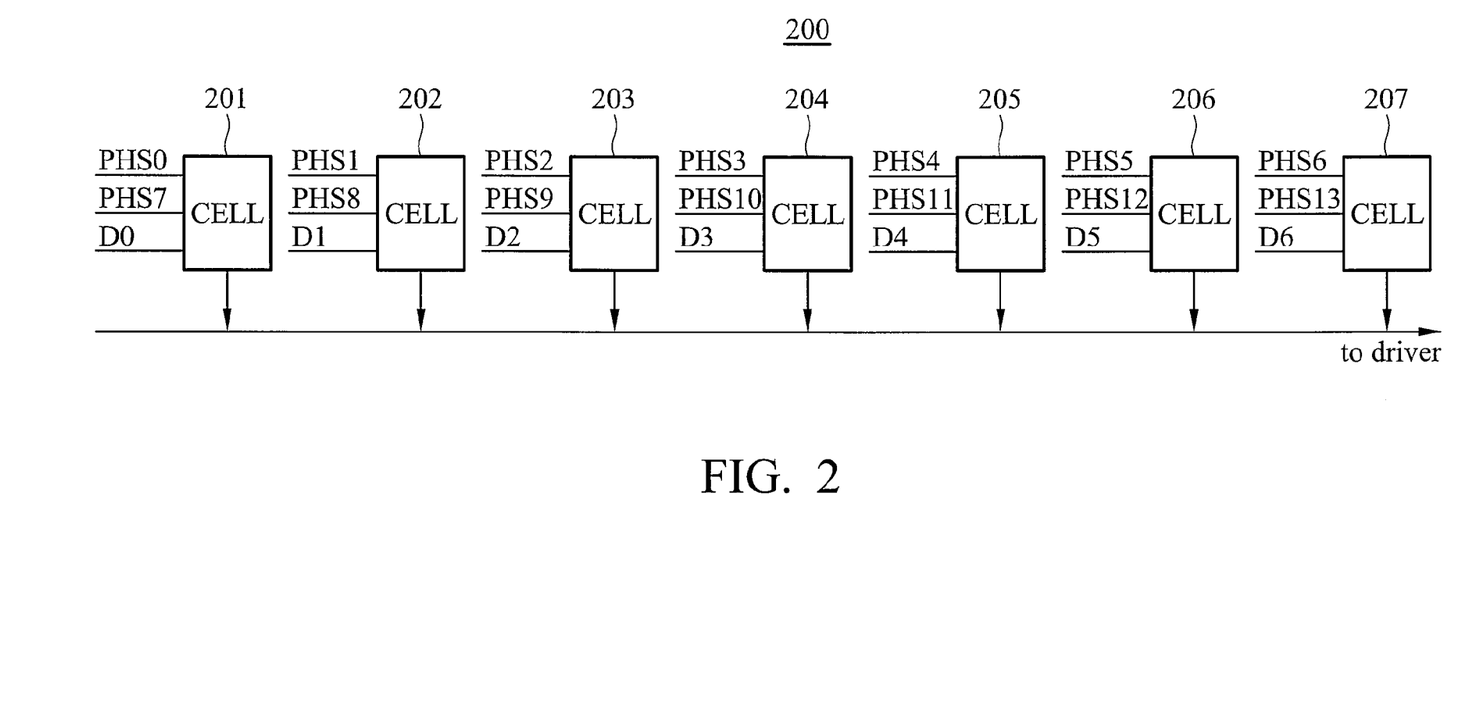
FIG. 2 is a block diagram of a LVDS serializer channel including seven cells.
Figure 3A:
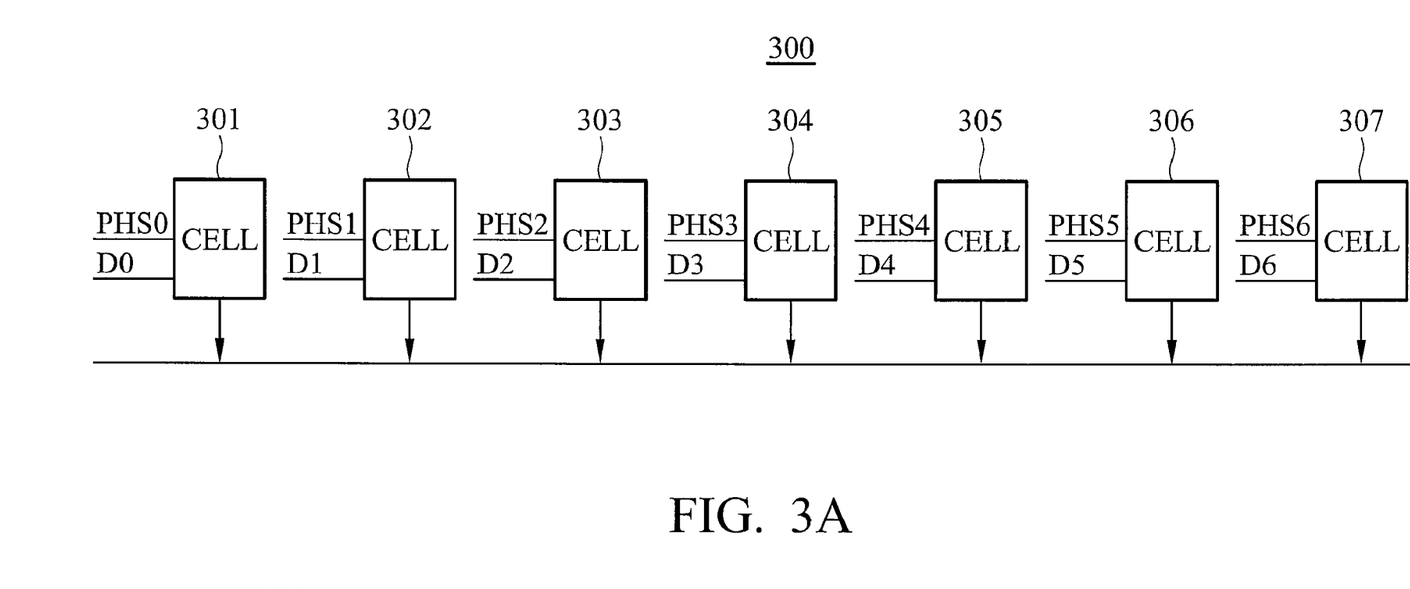
FIGS. 3A and 3B illustrate a block diagram of a TMDS serializer channel including ten cells.
Figure 3B:
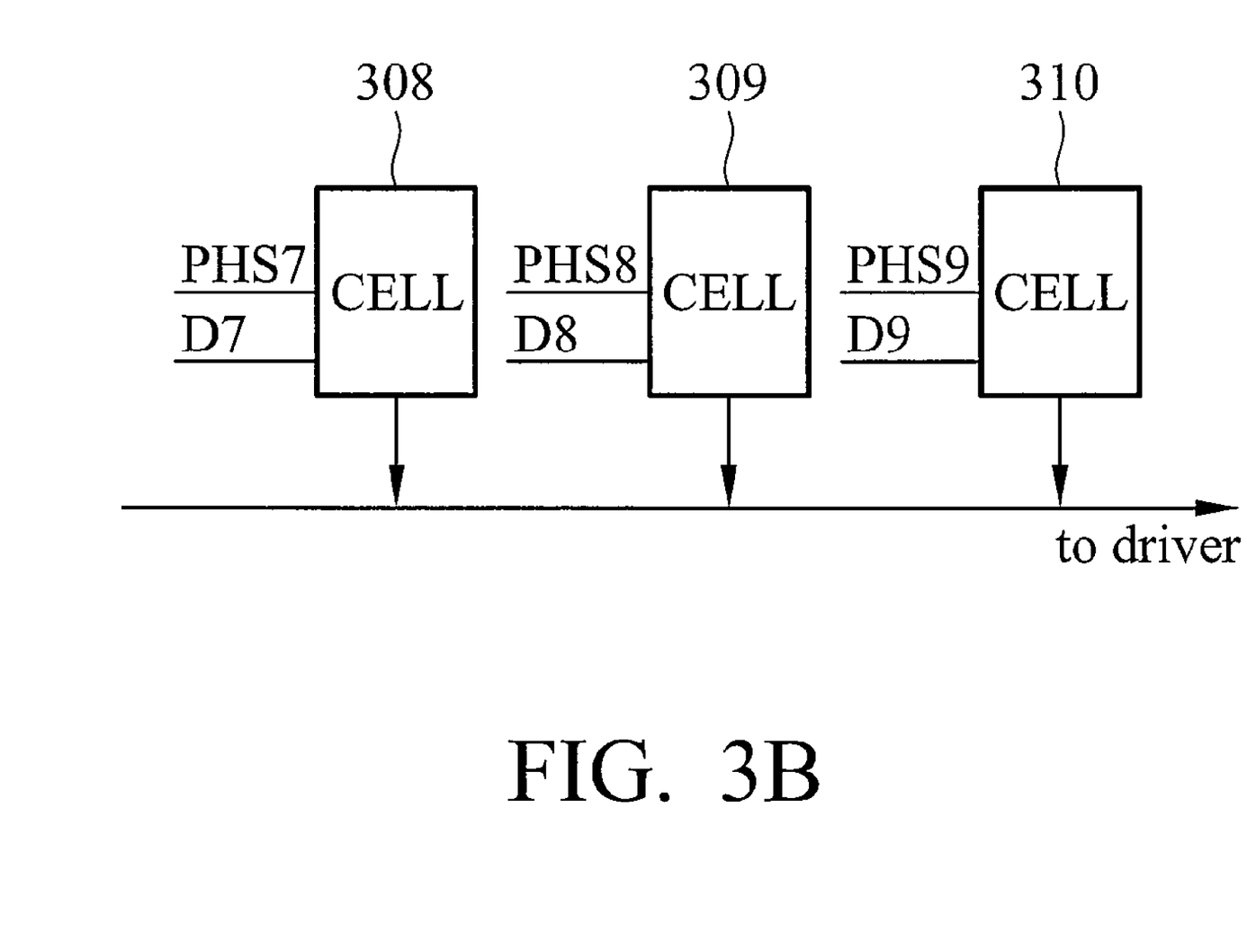

The LVDS serializer and TMDS serializer utilize parallel-to-serial devices to serialize data. FIG. 2 is a block diagram of an LVDS serializer channel 200 including seven cells 201 to 207. Each cell receives a data signal and two phase signals. In this embodiment, 14 phase signals deliver 14 phases respectively per clock period, wherein each two phases is delivered to a cell outputting a portion of a serial bit stream. A 7-bit data stream per clock period is then formed in the LVDS channel. FIGS. 3A and 3B illustrate a block diagram of a TMDS serializer channel 300 including ten cells 301~310. Each cell receives a data signal and a phase signal. In this embodiment, 10 phase signals deliver 10 phases respectively per clock period, wherein each phase is delivered to a cell outputting a portion of a serial bit stream. A 10-bit data stream by per clock period is then formed in the TMDS channel.

Larger layout area is occupied when combining LVDS and TMDS driving devices directly, since each occupies its serialization path respectively. When LVDS and TMDS driving devices are implemented separately, flexibility may be compromised.

BRIEF SUMMARY OF THE INVENTION

The invention utilizes a single serializer interface for both LVDS and TMDS output channels, providing a LVDS and TMDS dualfunction transmitter, including an encoder and a serializer. The encoder encodes twenty eight bits of LVDS signals to thirty bits of TMDS signals. The serializer includes four serializer channels for converting the LVDS signals to a serial signal when a LVDS mode is enabled, or converting the TMDS signals to the serial signal when a TMDS mode is enabled. Wherein a first serializer channel is coupled to seven bits of the LVDS signals and outputting a first pair of differential signals. Second, third and fourth serializer channel are coupled to seven bits of the LVDS signals and ten bits of TMDS signals, and outputting a second, third and fourth pair of differential signals, respectively.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 4:
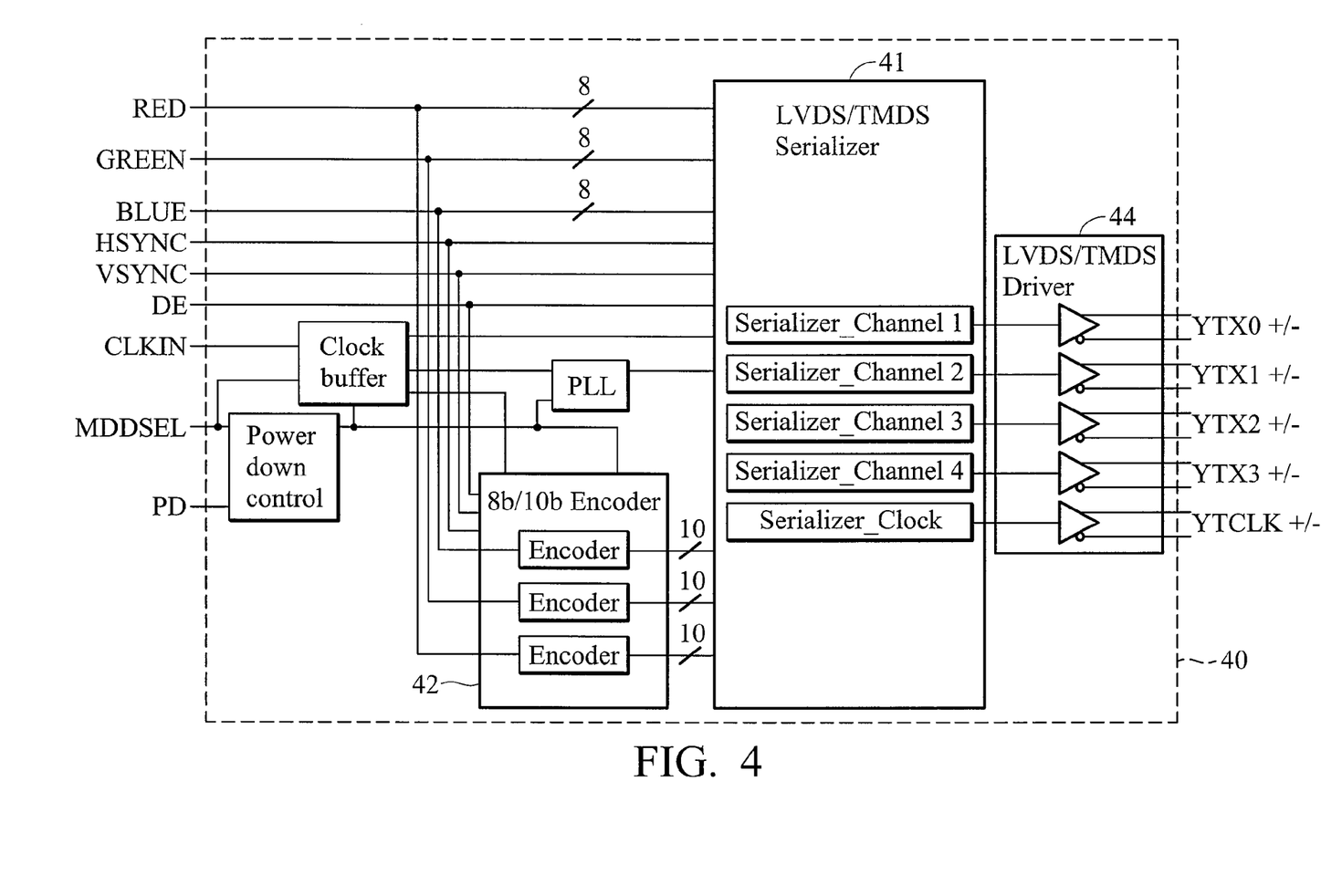
FIG. 4 is a block diagram of a LVDS/TMDS dualfunction transmitter according to an embodiment of the invention.

The invention provides a novel architecture for LVDS/TMDS dualfunction transmitters. FIG. 4 is a block diagram of a LVDS/TMDS dualfunction transmitter 40 according to an embodiment of the invention. Transmitter 40 includes twenty eight bits of first signals (i.e. LVDS signals including RED (0:7), GREEN (0:7), BLUE (0:7), HSYNC, VSYNC, DE and D23Y(not shown in FIG. 4) signals), an encoder 42 encoding the first signals to thirty bits of second signals (i.e. TMDS signals), a serializer 41, and a driver 44.

In this embodiment, serializer 41 is shared by both LVDS and TMDS interfaces. The first signals are delivered to serializer 41 directly in an LVDS mode. In a TMDS mode, the first signals are delivered to encoder 42 first to generate 30-bit second signals delivered to the same serializer 41. Serializer 41 is coupled to driver 44 driving differential pairs for both LVDS and TMDS output interfaces.

The LVDS interface defines four data channels, wherein each data channel serializes 7 bits of first signals to a differential pair. The TMDS interface defines three data channels, wherein each data channel serializes 10 bits of second signals to a differential pair. Serializer channel 0 (YTX0) is restricted to LVDS transmission, while other channels perform the common serialization for both LVDS and TMDS interfaces. Serializer channel 0 can be implemented as the serializer channel 200 of FIG. 2. In this embodiment, serializer channel 0 is coupled to seven bits of the first signals, outputting a first pair of differential signals for only LVDS interface. Serializer channels 1, 2, and 3 are coupled to seven bits of the first signals and ten bits of second signals, outputting second, third and fourth pairs of differential signals, respectively.

Figure 5A:
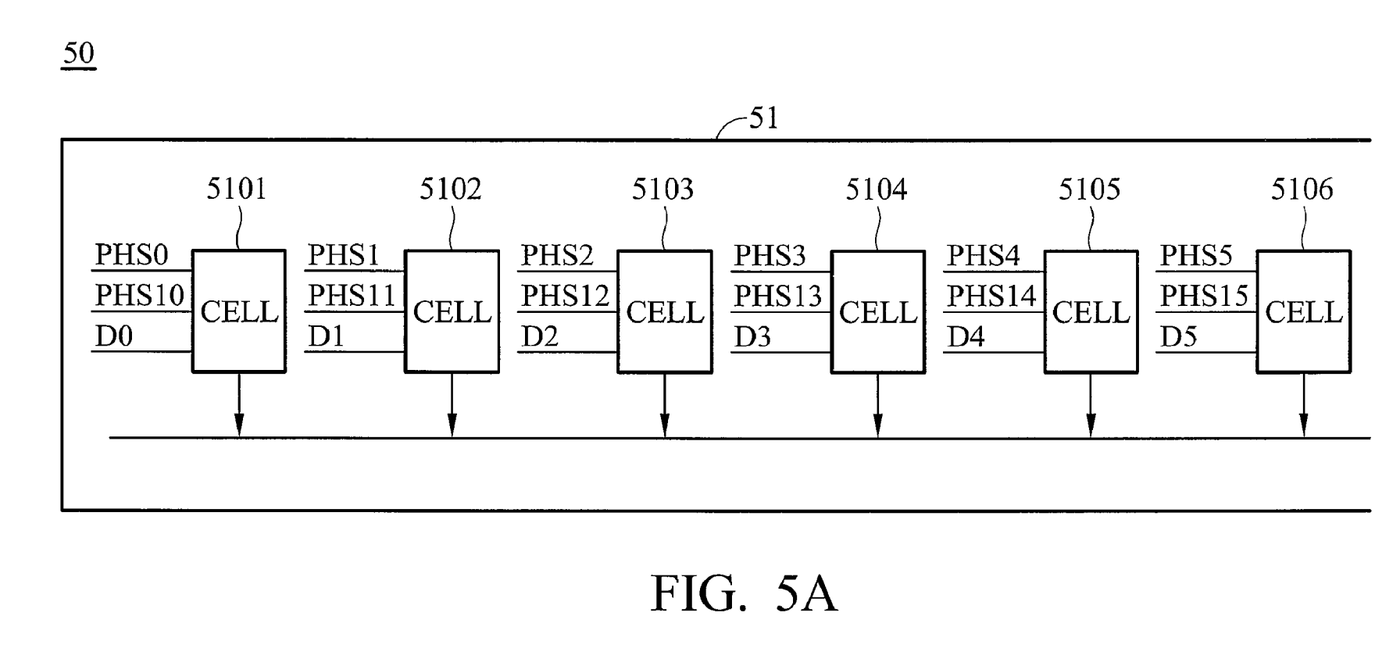
FIG. 5A to 5C illustrate a block diagram of a serializer channel 50 performing common serialization for both LVDS and TMDS of the serializer 41 of FIG. 4.
Figure 5B:
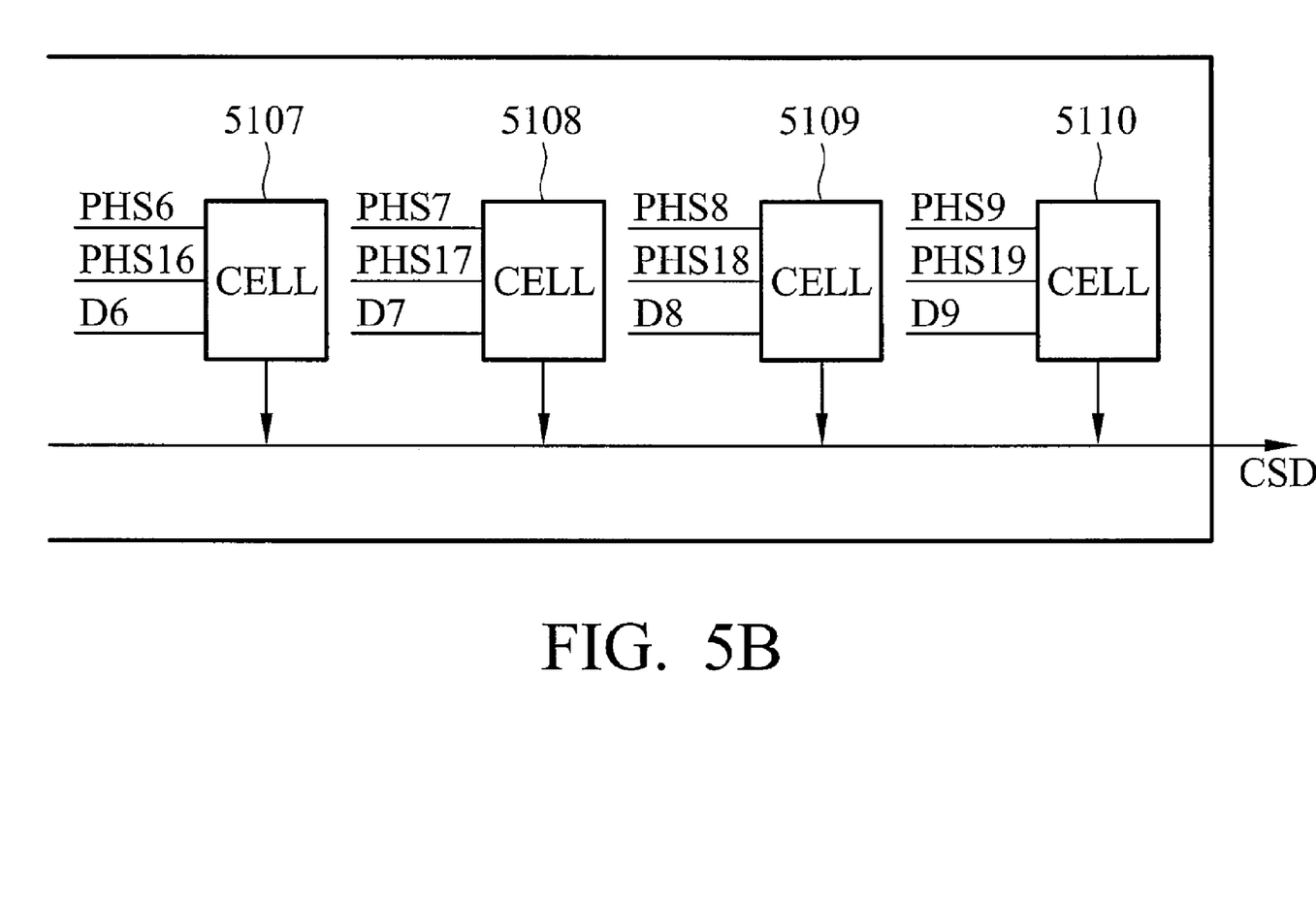
Figure 5C:
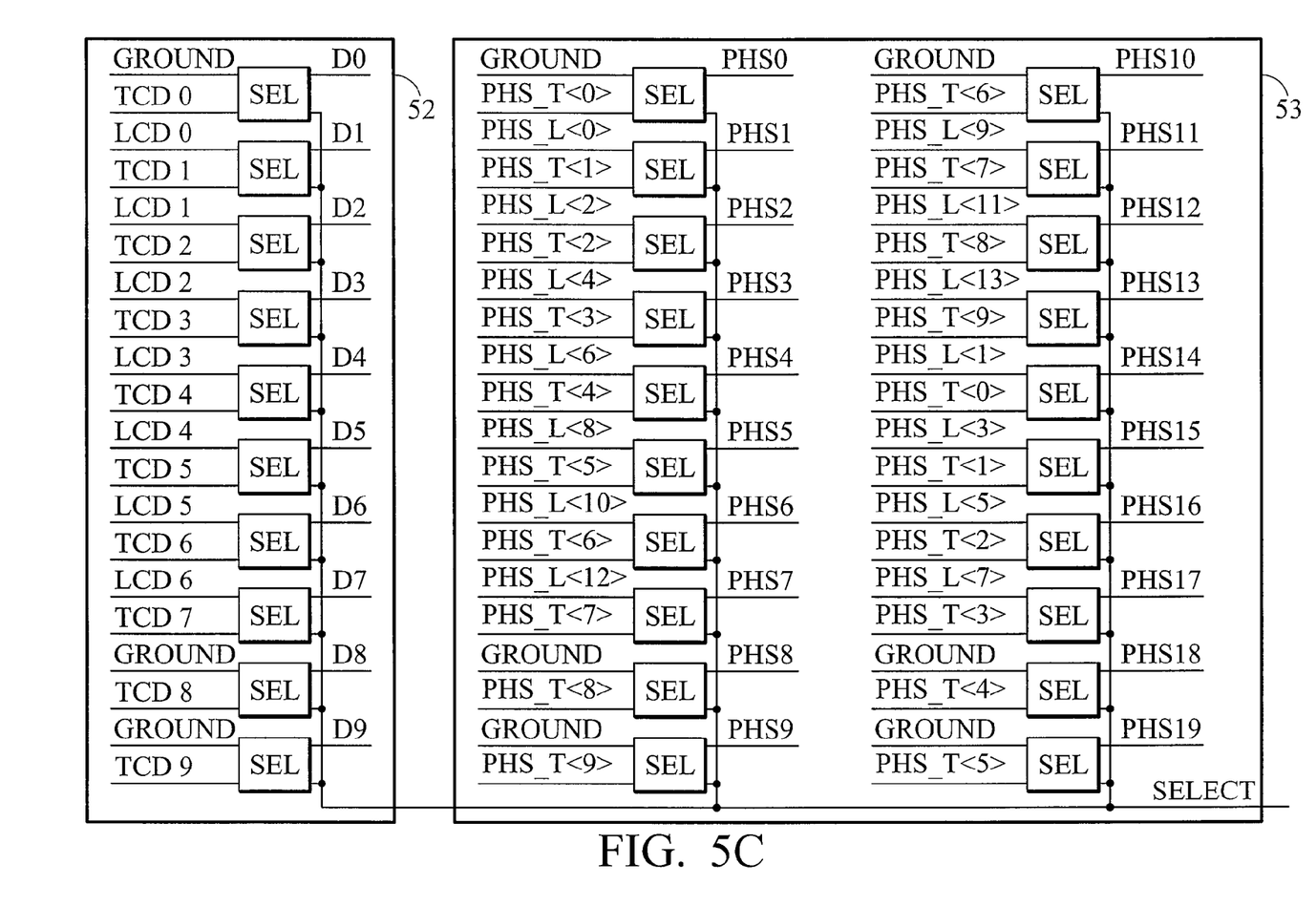

FIGS. 5A to 5C illustrate a block diagram of a serializer channel 50 performing common serialization for both LVDS and TMDS interfaces of the serializer 41 of FIG. 4. Serializer channel 50 includes a multiplexer 51, a data selector 52 and a phase selector 53. The data selector 52 selects one of 2 groups of input signals to be output to multiplexer 51, according to a signal SELECT; wherein one group includes three ground signals and seven first signals LCD0~LCD6, and the other group includes ten second signals TCD0~TCD9. The phase selector 53 selects between 2 group of phase signals output to multiplexer 51, according to the signal SELECT; wherein one group includes six ground signals and fourteen LVDS phase signals PHS_L<0>~PHS_L<13>, and the other group includes 2 copies of ten TMDS phase signals PHS_T<0>~PHS_T<9>.

In LVDS mode, multiplexer 51 receives three ground signals and seven first signals LCD0~LCD6 from data signals D0~D9, and six ground signals and fourteen LVDS phase signals PHS_L<0>~PHS_L<13> from phase signals PHS0~PHS19. Only seven cells of the multiplexer 51, cell 5102~5108, are active in LVDS mode. Two LVDS phase signals are delivered to a cell outputting a portion of a serial bit stream. A 7-bit data stream per clock period is then output to the serial signal CSD.

In TMDS mode, multiplexer 51 receives ten TMDS second signals TCD0~TCD9 from data signals D0~D9, and two copies of ten TMDS phase signals PHS_T<C>~PHS_T<9> from phase signals PHS0~PHS19. Either of the 2 TMDS phase signals are selected by a cell outputting a portion of a serial bit stream. A 10-bit data stream per clock period is then output to the serial signal CSD.

By implementing embodiments of the invention, a compact design occupying smaller layout area than conventional architectures can be achieved. The estimated layout area conserved is about the same as that for a TMDS transmitter. The shared serializer also transmits the parallel data through a common path, allowing common buffer and common driver.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A LVDS and TMDS dualfunction transmitter, comprising:
   an encoder encoding twenty eight bits of LVDS signals to thirty bits of TMDS signals;
   a serializer comprising first to fourth serializer channels, converting the LVDS signals to a serial signal by the first to four serializer channels when a LVDS mode is enabled, and converting the TMDS signals to the serial signal by the second to four serializer channels when a TMDS mode is enabled;
   wherein the first serializer channel coupled to seven bits of the LVDS signals and outputting a first pair of differential signals; and
   the second, third and fourth serializer channels coupled to seven bits of the LVDS signals and ten bits of TMDS signals, and outputting a second, third and fourth pair of differential signals, respectively.

2. The LVDS and TMDS dualfunction device as claimed in claim 1, wherein each of the second, third and fourth serializer channels comprises:
   a multiplexer converting the seven bits of LVDS signals to the serial signal when the LVDS mode is enabled, and converting the ten bits of TMDS signals to the serial signal when the TMDS mode is enabled;
   wherein the multiplexer comprises ten cells, each cell has an input terminal and an output terminal coupled to the serial signal, and receives first and second phase signals.

3. The LVDS and TMDS dualfunction device as claimed in claim 2, wherein when the LVDS mode is enabled:
   seven cells having an input terminal coupled to the LVDS signals and receiving active first and second phase signals and other three cells having an input terminal coupled to a ground voltage and receiving inactive first and second phase signals.

4. The LVDS and TMDS dualfunction device as claimed in claim 2, wherein when the TMDS mode is enabled:
   ten cells having an input terminal coupled to the TMDS signals and receiving active first and second phase signals.

* * * * *